Jan. 5, 1932. N. N. FEDT, JR 1,839,541
SCISSORS SHARPENING DEVICE
Filed Jan. 15, 1931    2 Sheets-Sheet 1
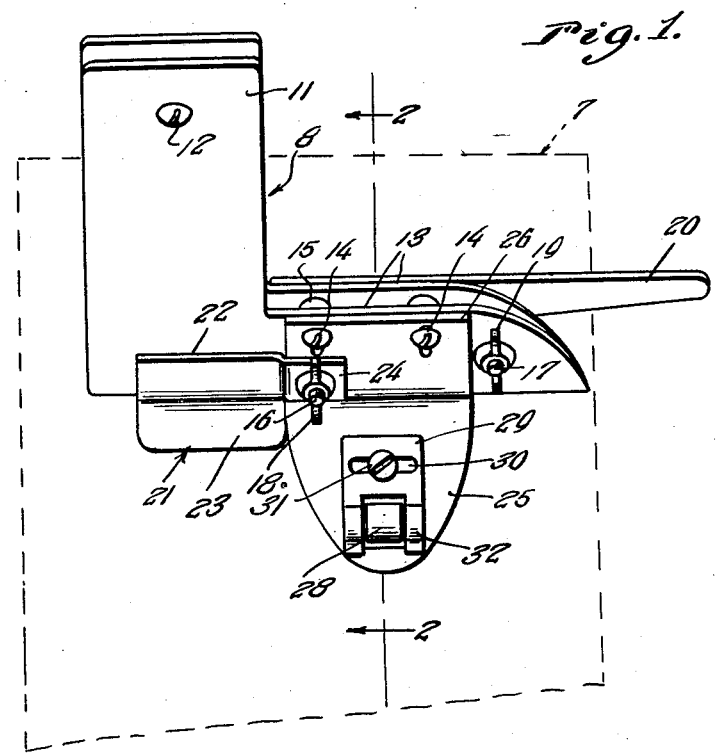
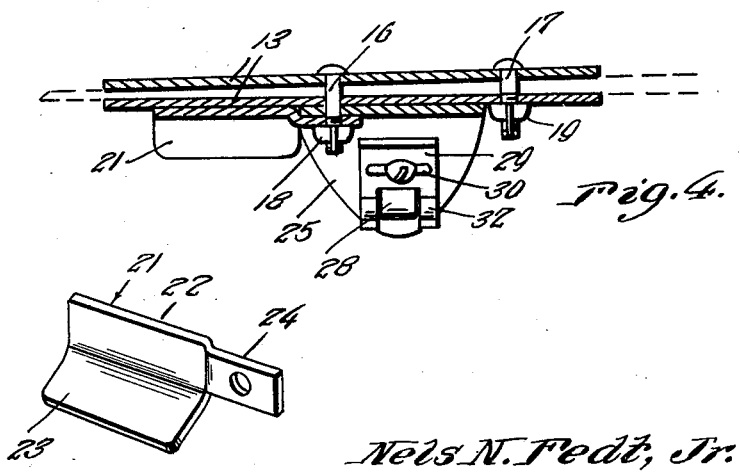
Inventor
*Nels N. Fedt, Jr.*
By *Clarence A. O'Brien*
Attorney Jan. 5, 1932.   N. N. FEDT, JR   1,839,541
SCISSORS SHARPENING DEVICE
Filed Jan. 15, 1931    2 Sheets-Sheet 2
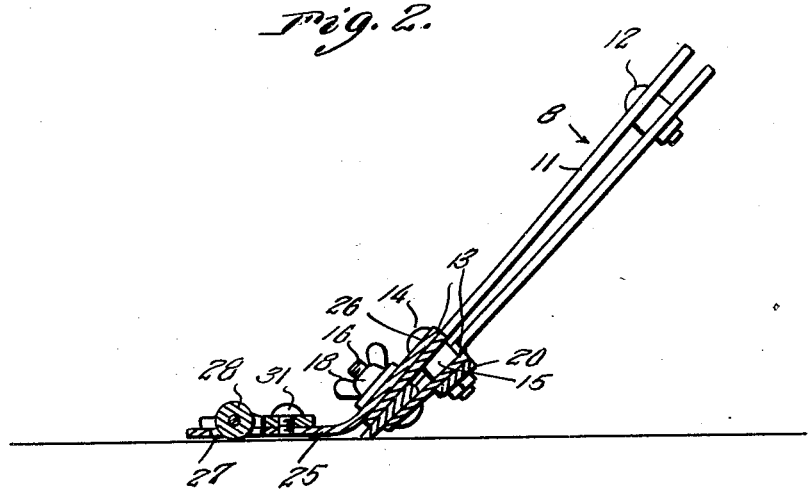
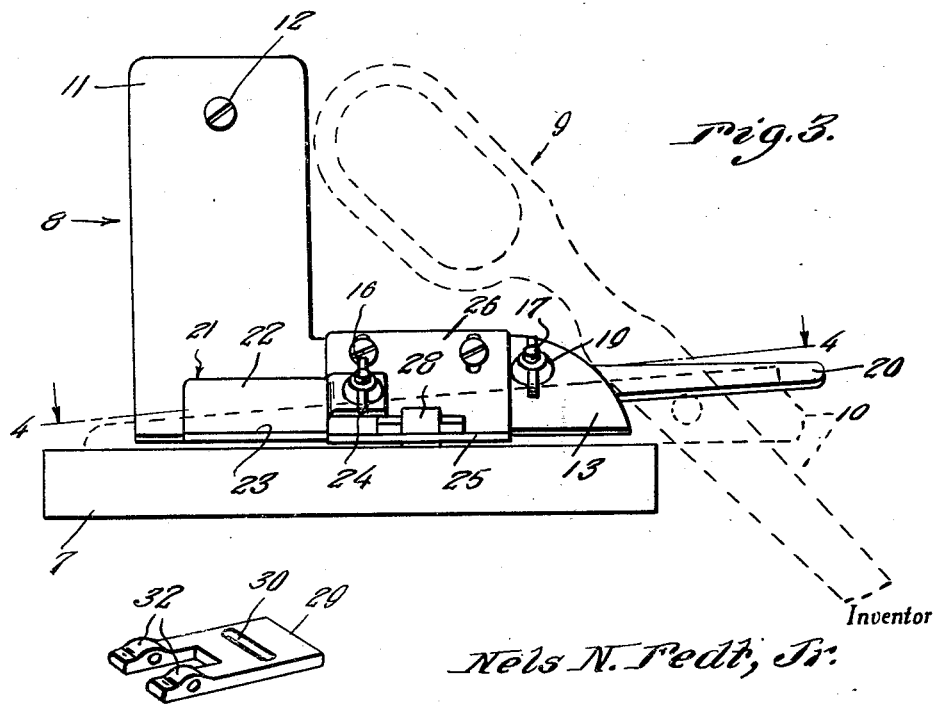
Inventor
Nels N. Fedt, Jr.
By Clarence A. O'Brien
Attorney Patented Jan. 5, 1932

1,839,541

UNITED STATES PATENT OFFICE

NELS N. FEDT, JR., OF WATERTOWN, SOUTH DAKOTA

SCISSORS SHARPENING DEVICE

Application filed January 15, 1931. Serial No. 508,985.

This invention relates to an improved device in the nature of an especially designed holder for barber's scissors to permit the blades of the scissors to be conveniently held in proper relationship to a hone for sharpening the cutting edges of the blades.

The idea of the invention is to provide each barber with his individual holder to expedite sharpening and proper maintenance of scissors, whereby to save time and to obviate the necessity of keeping surplus scissors on hand while other pairs of scissors are being sent out for sharpening.

In carrying the inventive conception into practice, I have discovered a simple and expedient mechanical holder which, it is believed, will permit comparatively inexperienced barbers to handle the scissors with ease and accuracy to insure proper conditioning of the cutting blades.

My primary aim is to generally improve upon scissors holders of this class by providing a device which is characterized by unusual simplicity, durability, and convenience in arrangement of details to expedite manipulation thereof by the user.

In the drawings:—

Figure 1 is a top plan view of a device constructed in accordance with the present invention.

Fig. 2 is a section on the line 2—2 of Fig. 1.

Fig. 3 is a front elevation of the structure seen in Fig. 1.

Fig. 4 is a horizontal section on the line 4—4 of Fig. 3.

Fig. 5 is a perspective view of one of the details.

Fig. 6 is a perspective view of another one of the details.

In the drawings, the numeral 7 designates conventional hone and 8 represents generally the holder or clasp for the scissors 9, the blades of the scissors being represented by the numeral 10. The holder comprises a pair of plates including companion portions 11 secured together by an appropriate fastener 12 and functioning somewhat as a handle. This is arranged diagonally to the surface of the hone as shown in Fig. 1, when the device is in use. The plates include lateral companion extensions 13 which are suitably shaped and cooperate in forming a sheath in which the blades 10 of the scissors are selectively clamped as shown in Fig. 2.

These extensions are maintained assembled by bolts 14 and spacing washers 15 while additional clamping bolts at 16 and 17 having complemental wing members 18 and 19 respectively. The numeral 20 designates the suitably shaped handle carried by the adjacent plate of the sheet. The numeral 21 designates generally a bracket including complemental flanges 22 and 23 and shaped as shown to form a rest for the thumb of one hand.

The numeral 24 designates an offset shank which connects with the adjacent bolt 16 and is held in place by the nut 18 as shown in Fig. 1.

The numeral 25 designates a shoe which is adapted to rest in close proximity to the surface of the hone 7 as shown in Fig. 2. The shoe includes an attaching flange 26 secured by slots to the bolts 14. The pointed end portion of the shoe is formed with an opening 27 which accommodates an anti-friction guiding roller 28. This roller is carried by a suitable mounting fixture 29 having a slot 30 engaging a retaining screw 31. One end portion of the fixture 29 is bifurcated, and the furcations 32 are formed with bearings to accommodate the trunnions on the anti-friction roller 28.

This fixture 29 including the roller 28 is adjustable of the unit with respect to the shoe to make for better attachment of the shoe and promote more sensitive operation of the complete device. The gist of the invention is in the provision of a pair of substantially L-shaped plates wherein the portions 11 are fastened together in such a manner as to form a hand grip, with the horizontal portions so related and bolted together, as to facilitate clamping of the blades of this scissors therein. This holder carries supplemental thumb brackets 21, a roller equipped guide shoe 25, and a second handle 20. All of these details are mechanically related to expedite handling of the device and subsequent expeditious honing of the scissors blades.

The present embodiment of the invention has been disclosed in considerable detail merely for the purpose of exemplification, since in actual practice it attains the features of advantage enumerated as desirable in the statement of the invention and the above description.

It is to be understood that by describing in detail herein any particular form, structure, or arrangement, it is not intended to limit the invention beyond the terms of the several claims, or the requirements of the prior art.

Having thus described my invention, what I claim as new is:—

1. A sharpening device of the class described comprising a pair of diagonally arranged substantially L-shaped plates each having one limb extending upwardly and its other limb extending horizontally, means for clamping the horizontal limbs on a blade, a shoe having its upper part connected to the front face of the front horizontal part and its lower part extending in a horizontal plane forwardly of the plate, and a roller carried by said forwardly extending part of the shoe.

2. A sharpening device of the class described comprising a pair of diagonally arranged substantially L-shaped plates each having one limb extending upwardly and its other limb extending horizontally, means for clamping the horizontal limbs on a blade, a shoe having its upper part connected to the front face of the front horizontal part and its lower part extending in a horizontal plane forwardly of the plate, a roller carried by said forwardly extending part of the shoe, means for adjusting the position of the roller on the forwardly extending part of the shoe, a front piece connected to the rear part of the shoe and extending at one edge thereof, and a handle forming piece connected to the rear face of the horizontal part of the rear plate and extending in an opposite direction from the thumb piece.

In testimony whereof I affix my signature.

NELS N. FEDT, JR.